E. F. PRENTISS & C. C. PARSONS.
Preparation from Indian Corn.
No. 63,175.
Patented March 26, 1867.
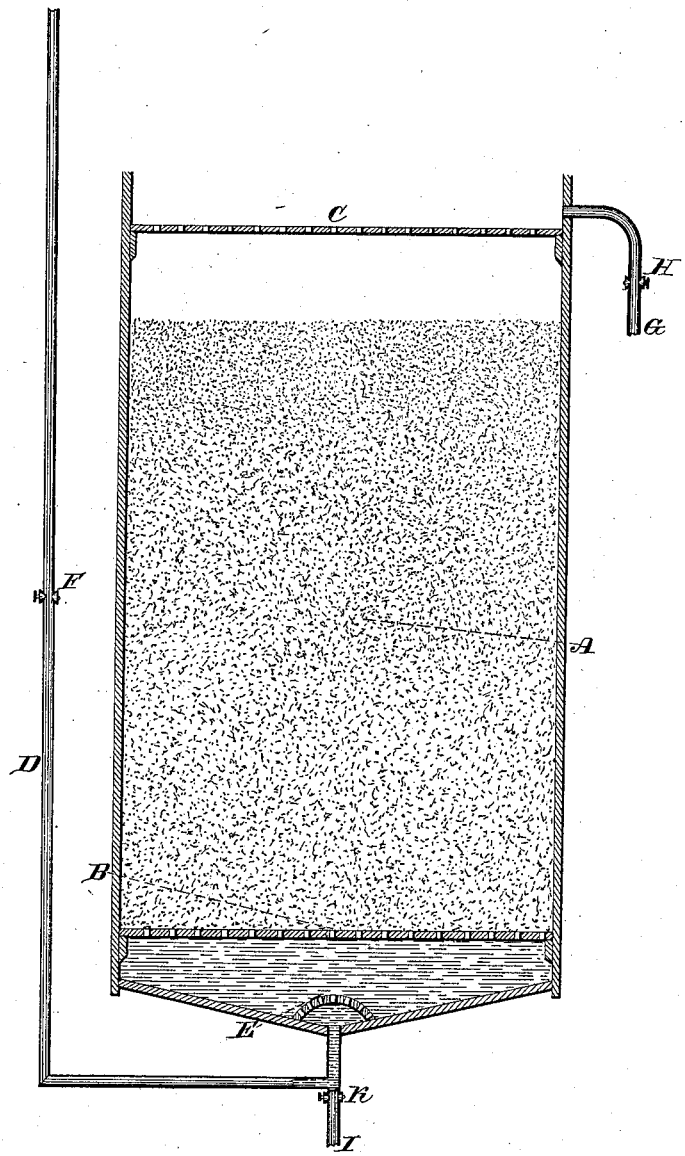
Witnesses:
John Lathrop
J. E. Shaw
Inventor
E. Truman Prentiss
C. C. Parsons

United States Patent Office.

ELIJAH FREEMAN PRENTISS, OF PHILADELPHIA, PENNSYLVANIA, AND CHARLES CHAUNCY PARSONS, OF BOSTON, MASSACHUSETTS.

Letters Patent No. 63,175, dated March 26, 1867; antedated March 15, 1867.

IMPROVED PREPARATION FROM INDIAN CORN.

*The Schedule referred to in these Letters Patent and making part of the same.*

TO ALL WHOM IT MAY CONCERN:

Be it known that we, ELIJAH FREEMAN PRENTISS, of Philadelphia, in the State of Pennsylvania, and CHARLES CHAUNCY PARSONS, of Boston, in the State of Massachusetts, have invented a certain new and useful manufacture consisting of a Preparation from Indian Corn; and we do hereby declare that the following is a full, clear, and exact description of the mode of preparing the same, reference being had to the annexed drawings, and to the letters of reference marked thereon.

The drawings represent apparatus adapted to the production of our improved manufacture.

In the drawings, A is a vessel about ten feet high and five feet in diameter. B is a perforated false bottom, the perforations, of about one-eighth inch in capacity, being placed more closely together towards the circumference than towards the centre, in order to secure a more equal distribution of the liquid introduced through the pipe D. G is a perforated cover resting on a ledge about one foot below the top of the vessel, and made so that it can be easily removed. D is a pipe terminating in a rose-head, E, at the bottom of the vessel A, and is also furnished with a stop-cock, F, for regulating the supply of water. G is a pipe opening into the vessel A above the cover C, and is provided with a stop-cock, H. I is a pipe for drawing off the contents of the vessel A, when desired. K is a stop-cock. We first pass the corn between rollers adjusted so that the corn shall be bruised or crushed, but not ground into meal. In preparing for a mash we place the usual proportion of malt on the perforated bottom B. We next put the crushed corn in the vessel A, filling said vessel within about a foot of the cover C, this space being left to allow for the swelling of the grain. We then introduce water, heated to a temperature of 165° Fahrenheit, slowly through the pipe D into the vessel A. This water percolates up through the grain until the latter is saturated. The water is then shut off and the contents rest for about thirty minutes. We then admit water slowly at a temperature of 170° Fahrenheit, through the pipe D, filling the vessel two or three inches above the level of the grain. The cock F is then closed and the contents of the vessel A are allowed to rest for three hours. The wash is then drained off through the pipe I. The cock K is then closed, and the cock F partially opened, and water, at a temperature of about 180° Fahrenheit, is admitted very slowly. The water filters upwards through the grains, and flows off through the pipe G, carrying with it as much of the soluble matters as may be desired. The inward flow of water is permitted as long as desired, at a temperature increasing to 195° Fahrenheit at the end of the operation. We prefer to stop off the water when there shall have been admitted from the commencement of the operation about twenty gallons of water to each bushel of grain treated. The operation of mashing is finished by drawing off through pipe I all the liquid that will run off. Wash running off too weak for fermentation may be evaporated down to a proper strength or be used in treating the next mash. The residual grains in the state in which they come from the vessel will be found to be a very valuable food for cattle, by reason of the heating qualities of the corn having been removed, or, if dried (by steam or in any other convenient way) and ground into meal, or kept unground, may be so preserved for any length of time, and can be transported without the fermenting to which ordinary meal is subject.

We claim as a new manufacture, and desire to secure by Letters Patent—

The preparation from Indian corn made substantially in the manner described.

E. FREEMAN PRENTISS,
C. CHAUNCY PARSONS.

Witnesses:
   J. E. SHAW,
   JOHN LATHROP.